US012713237B2

(12) United States Patent
Powers

(10) Patent No.: US 12,713,237 B2
(45) Date of Patent: Aug. 18, 2026

(54) APPLYING SHAKEN PROCEDURES TO LEGACY PROTOCOLS

(71) Applicant: Global Business Software Development Technologies, Inc., Granbury, TX (US)

(72) Inventor: Michael W. Powers, Lubbock, TX (US)

(73) Assignee: Global Business Software Development Technologies, Inc., Granbury, TX (US)

( * ) Notice: Subject to any disclaimer, the term of this patent is extended or adjusted under 35 U.S.C. 154(b) by 0 days.

(21) Appl. No.: 18/613,240

(22) Filed: Mar. 22, 2024

(65) Prior Publication Data

US 2025/0048100 A1 Feb. 6, 2025

Related U.S. Application Data

(63) Continuation of application No. 17/322,593, filed on May 17, 2021, now Pat. No. 11,985,500.

(Continued)

(51) Int. Cl.
*H04W 12/069* (2021.01)
*H04L 9/32* (2006.01)

(Continued)

(52) U.S. Cl.
CPC ......... *H04W 12/069* (2021.01); *H04L 9/3268* (2013.01); *H04M 3/436* (2013.01); *H04W 76/10* (2018.02)

(58) Field of Classification Search
CPC ... H04L 9/3268; H04L 9/3213; H04L 9/3247; H04L 9/3263; H04M 1/571; H04M 1/66; H04M 2203/6045; H04M 3/42042; H04Q 2213/13091; H04Q 3/72; H04Q 2213/13103; H04Q 2213/13106; H04Q 2213/13139; H04Q 2213/13176; H04Q 2213/1322; H04Q 2213/13345; H04Q 3/0029; H04W 12/069; H04W 12/12
See application file for complete search history.

(56) References Cited

U.S. PATENT DOCUMENTS 6,324,271 B1 * 11/2001 Sawyer .................. H04M 1/67 379/142.04
11,005,989 B1 * 5/2021 Jakobsson ............. H04M 3/382

(Continued)

FOREIGN PATENT DOCUMENTS

WO WO-2012001016 A1 * 1/2012 ............ H04M 3/543

*Primary Examiner* — Matthew C Sams
(74) *Attorney, Agent, or Firm* — Baker Botts L.L.P.

(57) ABSTRACT

In one embodiment, a network interface is operable to receive a communication request over a communication link of a radio access network. A processor communicatively coupled to the network interface receives the communication request from a first networked device over a communication link of a radio access network via a first communication protocol. The communication request comprises caller information. The processor then verifies caller information and obtains an authenticator, associated with the caller information, that indicates the communication request is authorized to be routed to a second networked device. The second networked device is configured to receive communications via a second communication protocol.

17 Claims, 6 Drawing Sheets

Related U.S. Application Data

(60) Provisional application No. 63/026,348, filed on May 18, 2020.

(51) Int. Cl.
*H04M 3/436* (2006.01)
*H04W 76/10* (2018.01)

(56) References Cited

U.S. PATENT DOCUMENTS

| | | | | |
|---|---|---|---|---|
| 11,044,356 | B2 * | 6/2021 | Powers | H04L 9/3213 |
| 11,323,563 | B1 * | 5/2022 | Rao | H04L 61/2503 |
| 11,425,241 | B2 * | 8/2022 | Milligan | H04W 12/068 |
| 2007/0121596 | A1 * | 5/2007 | Kurapati | H04M 3/436 370/356 |
| 2007/0127658 | A1 * | 6/2007 | Gruchala | H04Q 3/0029 379/142.05 |
| 2008/0112551 | A1 * | 5/2008 | Forbes | H04M 3/436 379/142.1 |
| 2017/0264443 | A1 * | 9/2017 | Tu | H04L 9/3268 |
| 2018/0176372 | A1 * | 6/2018 | Algard | H04M 3/42102 |
| 2018/0191703 | A1 * | 7/2018 | Nam | H04L 65/1016 |
| 2019/0068783 | A1 * | 2/2019 | Archer | H04M 3/42042 |
| 2020/0028690 | A1 * | 1/2020 | Barakat | H04L 9/3247 |
| 2020/0186642 | A1 * | 6/2020 | Kreiner | H04M 3/2281 |
| 2020/0221302 | A1 * | 7/2020 | Filart | H04L 65/1104 |
| 2020/0304546 | A1 * | 9/2020 | Chavez | H04L 65/1076 |
| 2021/0258421 | A1 * | 8/2021 | Jakobsson | H04M 3/382 |
| 2022/0182488 | A1 * | 6/2022 | Milligan | H04W 80/10 |
| 2023/0188363 | A1 * | 6/2023 | Aoshima | H04L 9/3268 713/156 |

* cited by examiner

APPLYING SHAKEN PROCEDURES TO LEGACY PROTOCOLS

PRIORITY

This application is a continuation, under 35 U.S.C. § 120, of U.S. patent application Ser. No. 17/322,593 filed on May 17, 2021, and entitled "Applying Shaken Procedures to Legacy Protocols" which claims priority to U.S. Provisional Patent Application No. 63/026,348 filed May 18, 2020, each of which are incorporated by reference in their entirety.

TECHNICAL FIELD

Certain embodiments of the present disclosure relate generally to mobile networks, and more particularly to blocking calls with falsified caller information associated with such mobile networks.

BACKGROUND

Mobile communication devices have become ubiquitous in modern day society. Countless individuals communicate with one another using mobile communication devices over a wireless network. Moreover, individuals may communicate domestically or internationally, or may even communicate over their networked devices when travelling abroad. The increased complexity and availability of the mobile communication network has led to an increased susceptibility of fraudulent activity. Fraudulent activity is an enormous threat to the telecommunication industry, especially because network operators across the world tend to earn a significant portion of revenue based on the source and destination of calls originating from another network operator.

Network operators have developed techniques to address fraudulent activity, but the integration of new technologies into established networks imposes many challenges relating to interoperability and interworking of these techniques between different network types or different signaling or communication protocols. Service providers may be able to recognize, verify, and trust communications from networks of the same type or operating within the same signaling or communication protocol, but no mechanisms exist to permit a communication originating in a network that implements legacy protocols to be routed to a network practicing a different protocol or vice versa. A solution is needed to remove barriers to the interoperability and interworking of techniques to alleviate fraudulent network activity across different network types and protocols.

SUMMARY OF PARTICULAR EMBODIMENTS

According to embodiments of the present disclosure, disadvantages and problems associated with fraudulent activity related to mobile networks may be reduced or eliminated.

In accordance with a particular embodiment of the present disclosure, a network interface operable to receive a communication request over a communication link of a radio access network. A processor communicatively coupled to the network interface receives a communication request from a first networked device over a communication link of a radio access network via a first communication protocol. The communication request comprises caller information. The processor then verifies caller information and obtains an authenticator, associated with the caller information, that indicates the communication request is authorized to be routed to a second networked device. The second networked device is configured to receive communications via a second communication protocol.

In accordance with a particular embodiment of the present disclosure, a method comprises receiving a communication request from a first networked device over a communication link of a radio access network via a first communication protocol. The communication request comprises caller information. The method then verifies caller information and obtains an authenticator, associated with the caller information, that indicates the communication request is authorized to be routed to a second networked device. The second networked device is configured to receive communications via a second communication protocol.

In accordance with particular embodiments of the present disclosure, a non-transitory computer readable medium comprises logic that when executed by a processor is operable to receive a communication request from a first networked device over a communication link of a radio access network via a first communication protocol. The communication request comprises caller information. The computer readable medium also verifies caller information and obtains an authenticator, associated with the verified caller information, that indicates the communication request is authorized to be routed to a second networked device. The second networked device is configured to receive communications via a second communication protocol.

Certain embodiments of the present disclosure may provide one or more technical advantages. A technical advantage of one embodiment includes decreasing network congestion and enabling higher throughput from networked devices by alleviating fraudulent communications or requests and decreasing the processing demand on elements of a cellular network. As another example, a technical advantage of one embodiment includes improving the communication quality of networked devices in a servicing area, improving the security of cellular networks and signaling protocols, and improving the processing power of a cellular network. As another example, a technical advantage of one embodiment includes improving the accuracy of caller-ID features for calls received over cellular networks. As another example, a technical advantage of one embodiment includes improving network security and alleviating fraudulent communications or requests across different service providers, network types, and signaling protocols. As another example, a technical advantage of one embodiment includes improving interoperability and interworking of techniques to mitigate malicious activity across different network types, network operators, and signaling or communication protocols.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and for further features and advantages thereof, reference is now made to the following description taken in conjunction with the accompanying drawings, in which.

DESCRIPTION OF EXAMPLE EMBODIMENTS

Figure 1:
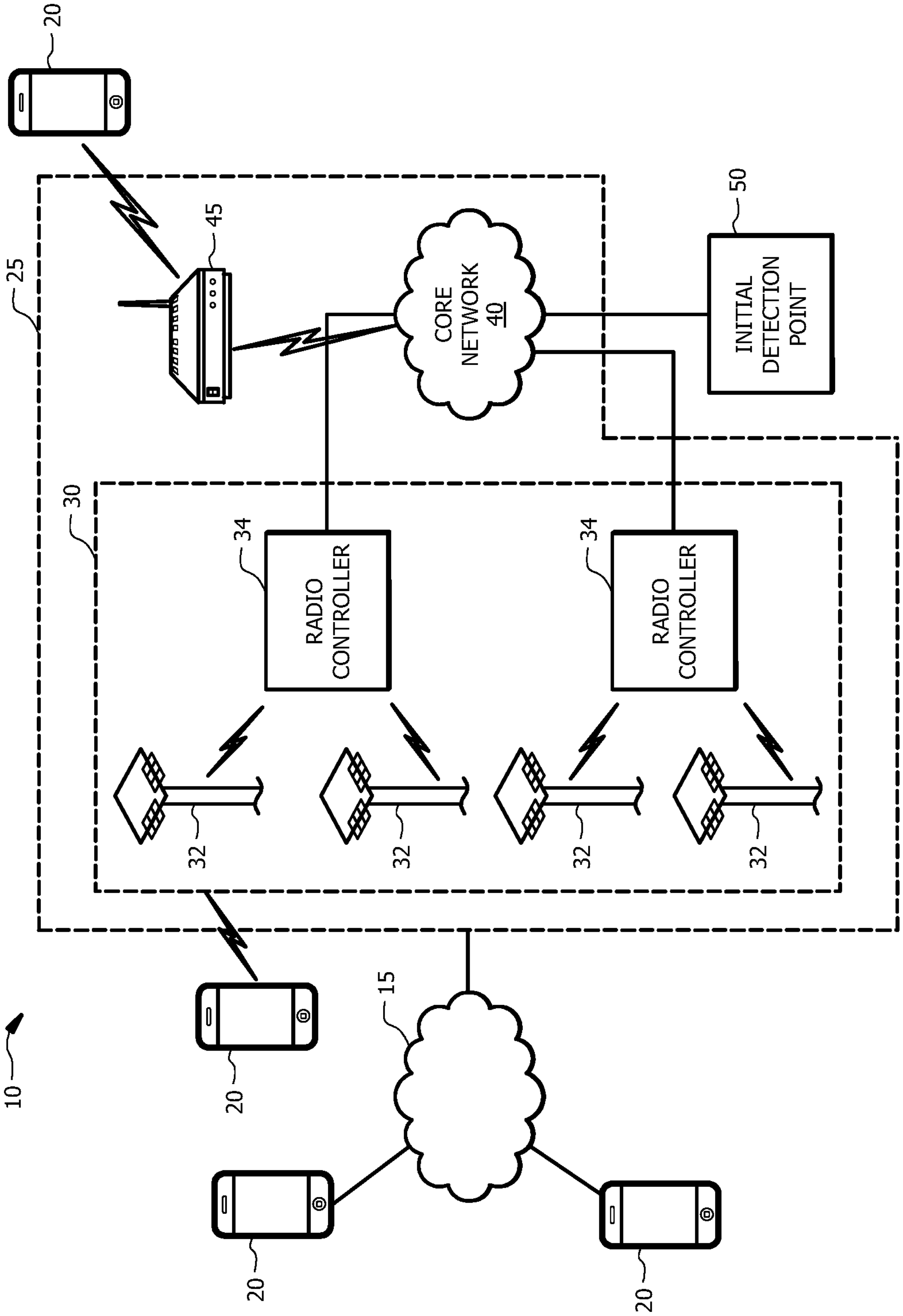
FIG. 1 illustrates a mobile communication system in which an initial detection point has been installed.

Embodiments of the present disclosure and its advantages are best understood by referring to FIGS. 1-6, like numerals being used for like and corresponding parts of the various drawings.

Networked devices have become ubiquitous in modern day society. Countless individuals communicate with one another using devices over a wireless network. Moreover, individuals may communicate domestically or internationally, or may even communicate over their networked devices when travelling abroad. The increased complexity and availability of the mobile communication network has led to an increased susceptibility of fraudulent activity. Fraudulent activity is an enormous threat to the telecommunication industry, especially because network operators across the world tend to earn a significant portion of revenue based on the source and destination of calls originating from another network operator.

The teachings of this disclosure recognize that it would be desirable to provide a system that applies certain policy rules to one or more characteristics associated with a communication request. This system would reduce or eliminate the technical problem of calls attempting to enter a communication network with falsified caller information. Furthermore, this system would reduce or eliminate tampering with a caller-ID to disguise the caller's identity, known as call "spoofing."

Moreover, the teachings of this disclosure recognize that it would be desirable to provide a system that, when receiving a communications request would verify that the caller information provided with the communications request matches the networked device that is placing the communications request. For example, the verification of matching caller networked device with the communications request may be accomplished by detecting the status of the network device associated with the caller information provided in the communications request. If, for example, when the network interface prompts the network device associated with the caller information provided in the communications requests to report its status, the network interface may terminate the communications request if the network device returns a status other than "busy." A status other than "busy" may indicate to the network interface that the networked device is not the device purported to be making the communication request based on the provided caller information. By terminating communications requests with non-matching caller information, the technical problem created by call spoofing and call refiling may be reduced or eliminated.

The teachings of this disclosure also recognize that it would be desirable to provide a system and method that, when receiving a communication request, would verify caller information for communications that are routed between networks using different signaling protocols or operated by different service providers. For example, a system may receive a communication or communication request via a signaling or communication protocol, use a certificate management or validation procedure to verify caller information, and modify or convert the communication or communication request to another signaling or communication protocol. A system and method may verify caller information with a certificate management or validation procedure before or after modifying or converting a communication request to another signaling protocol. In certain embodiments, a system or method may receive a communication or communications request via one signaling or communication protocol, store caller information (e.g., including certificate management or validation information) based on the received communication or communication request, and provide stored caller information to a network upon a verification request. In certain embodiments, the signaling or communication protocol for the verification request or provision of stored caller information may differ from the signaling or communication protocol for the communication or communication request.

FIG. 1 illustrates mobile communication system 10 in which initial detection point 50 has been installed. Mobile communication system 10 provides mobile communication service to networked devices 20 operating within a geographic area associated with mobile communication system 10. Mobile communication system 10 includes networked device 20; networked device 20 may include an access network 30, and core network 40. Mobile communication system 10 may support communication of any suitable type and/or in accordance with any appropriate communication standards including, but not limited to, any second generation ("2G"), third generation ("3G"), or fourth generation ("4G") standards, fifth generation ("5G") standards, or any suitable transitional generation standards (e.g., 2.5G, 2.75G, 3.5G, and 3.9G). Particular embodiments of mobile communication system 10 may support communications in accordance with, for example, Global System for Mobile Communications ("GSM"), CDMAOne, General Packet Radio Service ("GPRS"), Enhanced Data rates for GSM Evolution ("EDGE"), CDMA2000, Integrated Digital Enhanced Network ("iDen"), Universal Mobile Telecommunications System ("UMTS"), Wideband Code Division Multiple Access ("WCDMA"), Long Term Evolution ("LTE"), Long Term Evolution Advanced ("LTE-Advanced"), Wi-Fi, Voice over Internet Protocol ("VOIP"), and/or Worldwide Interoperability for Microwave Access ("WiMAX") communication standards.

Network 15 facilitates communications between components in mobile communication system 10, such as networked devices 20 and mobile network 25. This disclosure contemplates any suitable network 15 operable to facilitate communication between the components of system 10. Network 15 may include any interconnecting system capable of transmitting audio, video, signals, data, messages, or any combination of the preceding. Network 15 may include all or a portion of a public switched telephone network ("PSTN"), a public or private data network, a local area network ("LAN"), a metropolitan area network ("MAN"), a wide area network ("WAN"), a local, regional, or global communication or computer network, such as the Internet, a wireline or wireless network, an enterprise intranet, or any other suitable communication link, including combinations thereof, operable to facilitate communication between the components. This disclosure contemplates end networks having one or more of the described properties of network 15.

Networked device 20 is a communication device being used by a caller through mobile communication system 10. Networked device 20 is any type of networked device, including but not limited to networked device 20, mobile network 25, access network 30 (including base stations 32 and radio controllers 34), or core network 40. A networked device may be implemented using any suitable type of processing system and may include any suitable combination of hardware, firmware, and software. In certain embodiments, networked device 20 may comprise a mobile device, access network 30 (including base stations 32 and radio controllers 34), and/or core network 40. In certain embodiments, networked device 20 may be networked device 20. Networked device 20 may include one or more networked devices at one or more locations. Each networked device 20 may include any appropriate number of input devices, output devices, mass storage media, processors, memory, or other suitable components for receiving, processing, storing, and communicating data. For example, each networked device 20 may include a personal computer, workstation, network computer, kiosk, wireless data port, personal digital assistants ("PDAs"), one or more Internet Protocol ("IP") telephones, smart phones, table computers, one or more servers, a server pool, one or more processors within these or other devices, or any other suitable processing device capable of receiving, processing, storing, and/or communicating information with other components of mobile communication system 10. Networked device 20 may be a stand-alone computer or may be a part of a larger network of computers associated with an entity. Networked device 20 may also be a SIM box, an analog telephone adaptor ("ATA"), or a Private Branch exchange ("PBX"). Moreover, multiple networked devices 20 may exist in a SIM box. Networked device 20 may include physical devices, vehicles, home appliances, or other items embedded with network connectivity capable of exchanging data as part of the internet of things ("IoT").

Networked device 20 may communicate in mobile communication system 10 over a communication link on the radio access network. In certain embodiments, networked device 20 communicates to mobile network 25 via network 15. Networked device 20 may communicate directly to core network 40, through access point 45, and, in particular embodiments, networked device 20 may comprise mobile network 25.

Networked device 20 may be associated with a subscriber identifier and a hardware identifier. The subscriber identifier identifies the user and/or SIM of networked device 20. For example, a subscriber identifier may comprise a mobile identifier number ("MIN"), mobile subscriber identification number ("MSIN"), integrated circuit card ID ("ICC-ED"), international mobile subscriber identifier ("IMSI"), or mobile subscriber international ISDN number ("MSISDN"). Similarly, a hardware identifier identifies the hardware of networked device 20. For example, a hardware identifier may comprise an International Mobile Station Equipment Identity ("IMEI"), electronic serial number ("ESN"), or a mobile equipment identifier ("MEID").

Mobile network 25 is any type of network or networked device that is able to communicate with networked device 20, access network 30 (including base stations 32 and radio controllers 34), or core network 40. Mobile network 25 may be implemented using any suitable type of processing system and may include any suitable combination of hardware, firmware, and software. In certain embodiments, mobile network 25 may comprise networked device 20, access network 30 (including base stations 32 and radio controllers 34), and/or core network 40. In certain embodiments, mobile network 25 may be networked device 20. In the illustrated embodiment, mobile network 25 includes access network 30, core network 40, and access point 45. Mobile network 25 may include one or more mobile networks at one or more locations. Mobile network 25 may represent or include a radio access network and/or any elements responsible for providing a radio or air interface to networked device 20 and/or other elements of mobile communication system 10.

Access network 30 communicates wirelessly with networked devices 20 and serves as an interface between networked devices 20 and core network 40. Access network 30 may represent or include a radio access network and/or any elements responsible for providing a radio or air interface for core network 40. For example, in the illustrated embodiment, access network 30 includes base stations 32 and radio controllers 34. Access network 30 may also comprise mobility services edge ("MSE") routers. Networked device 20 may communicate to access network 30 over a communication link on the radio access network. In certain embodiments, access network 30 may support Integrated Services Digital Network ("ISDN") access signaling. ISDN may include a set of communication standards for simultaneous digital transmission of voice, video, data, or other network service.

Base stations 32 communicate wirelessly with networked devices 20 to facilitate mobile communication for networked devices 20. Base stations 32 may include any appropriate elements to communicate with networked devices 20 and to interface networked devices 20 with core network 40. For example, depending on the communications standards supported by access network 30 and core network 40, each base station 32 may represent or include a conventional base station, a Node B, an evolved Node B ("eNode B"), a radio base station ("RBS"), or any other suitable element capable of communicating with networked devices 20 wirelessly.

Radio controllers 34 control the operation of base stations 32 and interact with appropriate elements of core network 40. Radio controllers may include any appropriate elements to manage the operation of base stations 32. In particular embodiments, radio controllers 34 may be responsible for managing radio channels used by base stations 32, managing handoffs between base stations 32, concentrating communication channels transmitted by base stations 32, and/or otherwise managing the operation and interoperation of base stations 32 and interfacing base stations 32 with core network 40. For example, depending on the communications standards supported by access network 30 and core network 40, radio controllers 34 may each represent or include a base station controller ("BSC"), a radio network controller ("RNC"), or any other suitable collection of hardware and/or software appropriate for controlling base stations 32.

Core network 40 routes voice and/or data communicated by networked devices 20 from access network 30 to other networked devices 20 or to other communication devices coupled to core network 40 through landline connections or through other networks. In particular embodiments, core network 40 may include a backbone network and any backhaul elements connecting access network 30 to the backbone network. Core network 40 may support any appropriate standards or techniques for routing such communications. For example, in embodiments of mobile communication system 10 that support GSM or UMTS, core network 40 may represent a Mobile Application Part ("MAP") core network, while in embodiments of mobile communication system 10 that support CDMA2000, core network 40 may represent an IS-41 core network. Additionally, core network 40 may also be responsible for aggregating communication for longhaul transmission, authenticating users, managing user mobility, providing call control, billing, or other functionality associated with providing communication services to networked devices 20. In particular embodiments, core network 40 may include separate subnetworks for circuit-switched and packet-switched communication. For example, in embodiments that support GSM communication, core network 40 may include a network switching subsystem and any mobile switching centers ("MSCs") for providing circuit-switched services, as well as a GPRS core network and any Gateway GPRS Support Nodes ("GGSNs") and Serving GPRS Support Nodes ("SGSNs") for providing packet-switched services. In general, core network 40 may include any components suitable for routing and supporting voice and/or data communications for networked devices 20.

In certain embodiments, core network 40 may support Customized Applications for Mobile Networks Enhanced Logic ("CAMEL") protocol. The CAMEL protocol is a set of standards designed to work on either a GSM or UMTS network. When a CAMEL-enabled subscriber registers with core network 40, core network 40 transfers CAMEL subscription information ("CSI") to networked devices that need the information to provide CAMEL service to the subscriber. Network traffic through the CAMEL protocol may be referred to as on-network or off-network traffic. Further detail on the CAMEL protocol is available from standards documents (see, e.g., 3GPP TS 23.078 and 3GPP TS 29.078).

Moreover, core network 40 may also support the ISDN User Part ("ISUP") protocol. The ISUP protocol defines a set of procedures and messages. The ISUP protocol may provide core network signaling and may be compatible with both ISDN and non-ISDN traffic. Network traffic through the ISUP protocol may be referred to as on-network or off-network traffic. The ISUP protocol may use circuit identification code ("CIC") to set up calls from networked device 20 on core network 40. The CIC may be used between subscribers on a telephone exchange to enable a network device 20 to signal call-related information using ISUP messages. For example, the CIC signaled information may include the called party number, calling party number, and where the voice part of a call is carried.

Core network 40 may also support the Narrowband ISDN User Part ("N-ISUP") protocol. The N-ISUP protocol defines a set of procedures and messages. The N-ISUP protocol may provide core network signaling and may be compatible with both ISDN and non-ISDN traffic. Network traffic through the N-ISUP protocol may be referred to as off-network traffic. The N-ISUP protocol may use Bearer-Independent Call Control ("BICC") as a signaling protocol. The BICC protocol may also be compatible with ISUP protocol. The BICC may be used for interconnecting nodes that provide call service function and bearer control function and may be used to setup bearer paths for call transport links of network device 20 on core network 40. The transport links may be IP or asynchronous transfer mode ("ATM").

In certain embodiments, core network 40 may support session initiation protocol ("SIP") as a communications protocol for signaling and controlling multimedia communications sessions. For example, core network 40 may use SIP to control instant messaging, video calls, and VOIP communications. SIP may define the format of messages exchanged and the sequence of communications of networked device 20 and core network 40. In some embodiments, the SIP and ISUP protocols may be compatible to enable ISUP messages to be transported over SIP networks.

In certain embodiments, core network 40 may include subnetworks using different signaling or communication protocols and permit communications across multiple signaling protocols. For example, core network 40 may support ISUP protocol to signal call-related information as well as session initiation protocol ("SIP") to signal and control multimedia communications sessions. As another example, core network 40 may support CAMEL protocol to transfer CAMEL subscription information ("CSI") as well as session initiation protocol ("SIP"). Core network 40 may permit information originating or received via the ISUP or CAMEL protocols to be modified or converted for routing in SIP networks, and core network 40 may support the use of CAMEL features for an IP multimedia core network. In certain embodiments, modification or conversion of information (e.g., CAMEL subscription information, communications, or communications requests) may include the results of applying policy rules to characteristics of the information.

Access point 45 is a component that facilitates communications between networked device 20 and core network 40. While illustrated as facilitating communication between networked device 20 and core network 40, access point 45 may facilitate communication between network 15, networked devices 20, networked device 20, access network 30, core network 40, and/or any other component of mobile communication system 10. Access point 45 is any type of networking device that allows one networked device to communicate with another networked device. Mobile communication system 10 may comprise one or more access points 45. Access point 45 may include any interconnecting system capable of transmitting audio, video, signals, data, messages, or any combination of the preceding. Access point 45 may include all or a portion of a PSTN, a public or private data network, a LAN, a MAN, a WAN, a local, regional, or global communication or computer network, such as the Internet, a wireline or wireless network, an enterprise intranet, or any other suitable communication link, including combinations thereof, operable to facilitate communication between the components. This disclosure contemplates end networks having one or more of the described properties of access point 45.

Initial detection point 50 may represent any suitable component that facilitates: (1) applying one or more policy rules to one or more characteristics associated with a communication request; (2) when receiving a communication request, communicating (e.g., with an additional initial address message, or "IAM") to the network device 20 associated with the caller information received with the communication request; and/or (3) determining that the network device associated with the caller information is in use at the time the communication request was received. Initial detection point 50 may be connected to core network 40. Initial detection point 50 may include a network server, any suitable remote server, a mainframe, a host computer, a workstation, a web server, a personal computer, a file server, or any other suitable device operable to communicate with computers 24. In some embodiments, initial detection point 50 may execute any suitable operating system such as IBM's zSeries/Operating System ("z/OS"), MS-DOS, PC-DOS, MAC-OS, WINDOWS, UNIX, OpenVMS, or any other appropriate operating systems, including future operating systems. The functions of initial detection point 50 may be performed by any suitable combination of one or more servers or other components at one or more locations. In the embodiment where the components are servers, the servers may be public or private servers, and each server may be a virtual or physical server. The server may include one or more servers at the same or at remote locations. Also, initial detection point 50 may include any suitable component that functions as a server.

Moreover, for additional security, initial detection point 50 may encrypt communication to the requesting user. Similarly, a user may encrypt communication to networked device 50, access network 40, core network 50, and/or initial detection point 50. The encryption is used to protect the communication in transit from a device in mobile communication system 10 to another device in mobile communication system 10. Example encryption methods include Diffie-Hellman key exchange, Rivest-Shamir-Adleman ("RSA") algorithms, or protocols such as Secure Shell ("SSH"), Secure/Multipurpose Internet Mail Extensions ("S/MIME"), Advanced Encryption Standard ("AES"), Secure Sockets Layer ("SSL"), and Transport Security Layer ("TSL"). Initial detection point 50, requesting user, or any number of elements in mobile communication system 10 may contain the decryption key to decrypt the encrypted communication.

In certain embodiments, initial detection point 50 may facilitate, in coordination with other network elements, certificate management or validation procedures for cryptographic authentication (e.g., Signature-based Handling of Asserted information using toKENs ("SHAKEN") such as those based on X.509 certificate management standards and incorporated into the SHAKEN standards for telecommunications). Further detail on the SHAKEN standards is available from the governing bodies, including the Alliance for Telecommunications Industry Solutions and the SIP Forum and also from joint standards documents (ATIS-1000074, Signature-based Handling of Asserted Information using Tokens (SHAKEN); ATIS-1000080, Signature-based Handling of Asserted Information using Tokens (SHAKEN): Governance Model and Certificate Management).

In certain embodiments, certificate management or validation procedures for cryptographic authentication may include procedures that enable the authentication and assertion of a calling party by an originating service provider and the verification of the calling party by a terminating service provider. An originating service provider may have an authenticated relationship with a calling party, enabling the originating service provider to provide a verifiable mechanism to identify and trust an authorized calling party. For example, a signature can be generated and appended to a communication at an originating service provider, then routed to a terminating service provider, at which point an associated public certificate can be used to validate the signature. In certain embodiments, the originating service provider may attest to different levels of trust based on its relationship with the calling party. For example, a service provider may attest that the calling party can be fully trusted based on direct authentication of the calling party and verification of the associated calling party number. Certificate management or validation procedures for cryptographic authentication may be used to determine the level of trust in the originating entity and the calling party information it asserts.

In certain embodiments, initial detection point 50 may obtain a certificate, signature, or other authenticator in response to receiving a communication or communication request. Initial detection point 50 may obtain a certificate, signature, or other authenticator as a result of applying certificate management or validation procedures for cryptographic authentication. For example, initial detection point 50 may receive a certificate from a certificate provisioning service or a verified signature from a verification service as part of certificate management or validation procedures. In certain embodiments, initial detection point 50 may generate a certificate, signature, or other authenticator based on having an authenticated relationship with the calling party. In certain embodiments, initial detection point 50 may generate a certificate, signature, or other authenticator based on the application of policy rules to a communication request. In certain embodiments, initial detection point 50 may generate a certificate, signature, or other authenticator based on information it receives as part of certificate management or validation procedures.

In certain embodiments, initial detection point 50 may use a certificate, signature, or other authenticator to facilitate trusted communication. In certain embodiments, initial detection point 50 may append an authenticator to a message. For example, initial detection point 50 may insert an authenticator into a communication request that is a header to a communication. As another example, initial detection point 50 may append an authenticator as a header to a communication. In certain embodiments, initial detection point 50 may store a certificate, signature, or other authenticator. In certain embodiments, initial detection point 50 may transmit a certificate, signature, or other authenticator. For example, initial detection point 50 may provide an authenticator in response to a verification request from another network device. In certain embodiments, initial detection point 50 may receive a verification request from another network device seeking to verify a communication or communication request that has been routed to the network device.

In an additional exemplary embodiment of operation, initial detection point 50 may implement policy rules to determine a variety of actions (e.g., terminate, connect, hold) to apply to a communication request. The variety of actions and/or the determination of the variety of actions to apply may occur in real-time or near real-time to when a communication request is communicated from networked device 50. A communication request comprises a request to communicate with one or more networked devices 20. A communication request may precede the communication, may be a header to the communication, may be the communication itself, or any other type of message to indicate that a request for communication has been made. In certain embodiments, access network 30 communicates a request to initial detection point 50 to authorize the communication. In alternate embodiments, initial detection point 50 automatically receives the information to determine whether to authorize the communication. For example, access network 30 may route the communication to initial detection point 50.

The communication request may occur in real-time with the communication. In certain embodiments, the communication and/or communication request is communicated using the CAMEL protocol, the ISUP protocol, the SIP protocol, the BICC protocol, the Diameter protocol, and/or any other valid protocol. Moreover, the communication and/or communication request may be sent in on-network traffic and/or off-network traffic. Before the communication takes place or while the communication is taking place, initial detection point 50 may implement its policy rules to determine the action to take on the communication request and/or the communication itself. For example, the policy rule may instruct initial detection point 50 to hold the communication until an additional authorization is provided. In an exemplary embodiment, the communication is routed with the communication request to the initial detection point 50, and then initial detection point 50 may route the communication to its next routing point after determining whether to authorize the communication. Initial detection point 50 may determine whether to authorize the communication based on the results of applying certificate management and validation procedures to the communication, communication request, or other information relating to the communication or communication request (e.g., a subscriber or hardware identifier). For example, initial detection point 50 may terminate a communication request based on a failed certificate validation. Initial detection point 50 may append authorization or validation information to a communication or communications request and/or store authorization or validation information. In certain embodiments, initial detection point 50 may append a certificate, signature, or other authenticator to the communication or communication request before routing the communication to its next routing point. Initial detection point 50 may also store a certificate, signature, or other authenticator and provide the stored information in response to requests for authorization or validation. For example, initial detection point 50 may receive a communication or communications request via one signaling or communication protocol, store caller information (e.g., including certificate management or validation information) based on the received communication or communication request, and provide stored caller information to a network upon a verification request. In certain embodiments, the signaling or communication protocol for the verification request or provision of stored caller information may differ from the signaling or communication protocol for the communication or communication request. Initial detection point 50 may provide stored caller information, including a certificate, signature, or other authenticator, by appending the information to a verification request, appending the information to a communication or communication request, or transmitting the information without attachment.

Initial detection point 50 may then determine characteristics of the communication request. In certain embodiments, initial detection point 50 associates characteristics from the communication request to the subscriber identifier associated with the communication request. In certain embodiments, initial detection point 50 may also relate characteristics associated with the communication request to the called party number, the calling party number, the time of the call, the date of the call, and/or the calling party sub-address. Initial detection point 50 may also relate characteristics associated with the communication request to the hardware identifier, or may relate the characteristics to both the subscriber identifier and the hardware identifier. Initial detection point 50 may determine characteristics in a myriad of ways. Certain characteristics, such as the subscriber identifier, hardware identifier, and destination of the communication, may be determined from the communication and/or communication request. In addition, initial detection point 50 may look at past call detail records ("CDRs") to determine previous data records associated with the subscriber identifier and/or hardware identifier to identify characteristics of the communication request. For example, CDR may contain information of the party originating the communication, the party receiving the communication, the start time of the call, the end time of the call, the call duration, the cost of the communication, the billing phone number that is charged for the call, an identification of additional digits entered after the call was connected, whether the call was successfully connected, call type (e.g., SMS, VOIP, or voice), fault conditions encountered on the call, the routing of the call (e.g., Switch ID or Visitor Location Register ("VLR")), data communicated on call, or any other type of information or characteristics related to a communication. In certain embodiments, initial detection point 50 may associate a predefined number of past communications to the subscriber identifier and/or hardware identifier. Initial detection point 50 may also analyze characteristics associated with elements in mobile network 25 in mobile communication systems 10. For example, initial detection point 50 may determine the utilization and/or load of a networked device 20 in mobile communication system 10.

Initial detection point 50 may determine whether the characteristics meet any of the policy rules. The policy rules are rules that determine what type of action initial detection point 50 should take on a communication request or what type of action initial detection point 50 should take in response to a communication request. Initial detection point 50 may apply policy rules to the one or more characteristics associated with the communication request to determine the type of action to apply to the communication request. Policy rules consist of any type of rules, logic, algorithms, code, and instructions to determine what type of action initial detection point 50 should apply to the communication request. For example, policy rules may indicate that a communication request should be terminated if: the subscriber has placed a number of consecutive short duration calls to premium-rate telephone numbers, a maximum amount of termination fees accrued by a subscriber has been reached, the count of hardware identifiers associated with the subscriber identifier exceeds a subscriber identifier threshold, the count of hardware identifiers associated with the subscriber identifiers exceeds a hardware identifier threshold, the networked device 20 purporting to be placing the communication request does not respond to an IAM, the network device 20 purporting to be placing the communication request is not active or is not "busy," or any other logic, algorithm, policy, or rules that allows initial detection point 50 to determine the type of action to take for a communication request. As another example, policy rules may indicate that a communication request should be terminated if certificate validation fails. In certain embodiments, initial detection point 50 may generate an authenticator based on applying policy rules to a communication request. For example, applying policy rules may result in a rating (such as A, B, or C) that indicates the degree of trust for the communication. Initial detection point may append an authenticator to a communication or communication request and/or store the authenticator. In certain embodiments, initial detection point 50 may append information relating to certificate management procedures or certificate validation (e.g., a certificate, signature, or other authenticator) to a communication or communication request as a characteristic for consideration at another routing point in the network.

The policy rules may be created and inputted by an authorized user or may be determined by initial detection point 50 after performing statistical analysis. For example, initial detection point 50 may determine that networked device 20 in mobile network 25 becomes overloaded during a certain period of the day. Initial detection point 50 may change the strictness of the policy rules during those periods of the day. As another example, initial detection point 50 may determine one or more policy rules to apply from a set of policy rules based in part on the one or more characteristics associated with the communication request. For example, if the communication request occurs during a weekend, initial detection point 50 may select a certain subset of policy rules from the set of policy rules to apply to the communication request. As another example, if the communication request is associated with a flagged subscriber identifier or flagged hardware identifier, initial detection point 50 may apply a certain subset of policy rules from the set of policy rules.

Based on the application of the policy rules to the one or more determined characteristics, initial detection point 50 may perform an action on the communication request. For example, the application of the policy rules may indicate that initial detection point 50 terminate the communication request. As another example, the application of the policy rules may indicate that initial detection point 50 completes the communication request or holds the communication request. Initial detection point 50 may complete the communication request based on a successful certificate validation. In certain embodiments, initial detection point 50 may append a certificate, signature, or other authenticator to a communication request or communication. In certain embodiments, initial detection point 50 may comprise a default action, such as completing the request if one or more policy rules do not apply.

In certain embodiments, initial detection point 50 is also able to determine if one or more of the determined characteristics is included on an exemption list. The exemption list may contain a list of one or more determined characteristics (e.g., subscriber identifier, hardware identifier, destination call number, and originating call time). The exemption list may be predefined by an administrator or automatically determined by initial detection point 50. For example, initial detection point 50 may place networked device 20 on the exemption list based on the type of networked device 20 (e.g., a tablet is automatically included in the exemption list), a location associated with networked device 20, or any other information such that initial detection point 50 may make the determination on whether to place networked device 20 on the exemption list.

As an example embodiment of operation of implementing policy rules, initial detection point 50 may terminate a communication request when the subscriber exceeds a subscriber identification threshold. Initially, access network 30 may receive a communication request from networked device 20. The communication request comprises information such that initial detection point 50 may determine a subscriber identifier and a hardware identifier associated with networked device 20. A communication request is a request to authorize communication from networked device 20 to its intended recipient. A communication request may be communicated during initialization of a communication, as part of the communication, or in any other form of communication that identifies a subscriber identifier and a hardware identifier associated with networked device 20. Initial detection point 50 may then determine whether the hardware identifier has previously been associated with the subscriber identifier. If the hardware identifier has previously been associated with the subscriber identifier, initial detection point 50 may communicate a command to access network 30 or core network 40 to complete the communication request. Alternatively, initial detection point 50 may complete the communication request from networked device 20.

If the hardware identifier has not been previously associated with the subscriber identifier, initial detection point 50 may add the hardware identifier to a list of hardware identifiers associated with the subscriber identifier. Initial detection point 50 may also receive a list of hardware identifiers that are associated with the subscriber identifier, a count of hardware identifiers associated with the subscriber identifier, or any other information such that initial detection point 50 receives information associated with the hardware identifiers associated with the subscriber identifier.

Similar to associating the hardware identifier to the subscriber identifier, initial detection point 50 may associate the subscriber identifier to the hardware identifier. If the subscriber identifier has previously been associated with the hardware identifier, initial detection point 50 may communicate a command to access network 30 or core network 40 to complete the communication request. Alternatively, initial detection point 50 may complete the communication request from networked device 20.

If the subscriber identifier has not been previously associated with the hardware identifier, initial detection point 50 may add the subscriber identifier to a list of subscriber identifiers associated with the hardware identifier. Initial detection point 50 may also receive a list of subscriber identifiers that are associated with the hardware identifier, a count of subscriber identifiers associated with the hardware identifier, or any other information such that initial detection point 50 receives information associated with the subscriber identifiers associated with the hardware identifier.

In particular embodiments, initial detection point 50 also determines if the subscriber identifier, hardware identifier, or both are included on an exemption list. The exemption list may contain a list of subscriber identifiers and hardware identifiers that are excluded from complying with the hardware identifier threshold. For example, a service provider may have a tester SIM card that is inserted into multiple mobile phone equipment for testing purposes, and, therefore, should not be subject to the hardware identifier threshold. If the subscriber identifier or hardware identifier is included in the exemption list, initial detection point 50 may complete the communication request for networked device 20. The exemption list may be predefined by an administrator or automatically determined by initial detection point 50. For example, initial detection point 50 may place networked device 20 on the exemption list based on the type of networked device 20 (e.g., a tablet is automatically included in the exemption list), a location associated with networked device 20, or any other information such that initial detection point 50 may make the determination on whether to place networked device 20 on the exemption list.

Modifications, additions, or omissions may be made to mobile communication system 10 without departing from the scope of the disclosure. For example, mobile communication system 10 may include any number of networked devices 20, access networks 30 (including base stations 32 and radio controllers 34), core network 40, and initial detection points 50. Furthermore, the components of mobile communication system 10 may be integrated or separated. For example, access network 30, core network 40, and initial detection point 50 may be incorporated into a single component.

Figure 2:
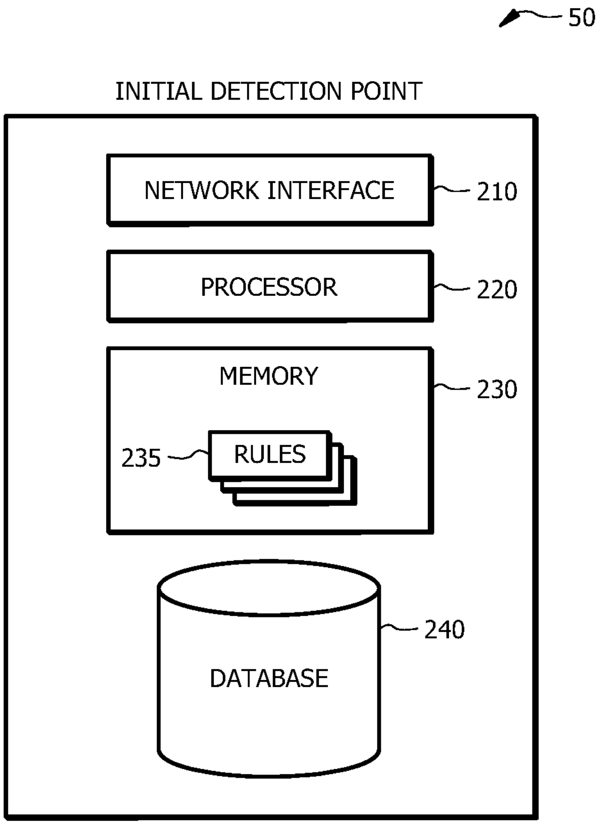
FIG. 2 is a block diagram showing in greater detail the contents of the initial detection point according to particular embodiments.

FIG. 2 is a block diagram showing in greater detail the contents of initial detection point 50 according to particular embodiments. As shown, initial detection point 50 includes network interface 210, processor 220, memory 230, and database 240.

Network interface 210 facilitates communication between processor 220, core network 40, or other components of initial detection point 50 or mobile communication system 10 over a data network. Network interface 210 may facilitate communication over portions of core network 40 or over a separate data network. In particular embodiments, network interface 210 includes or represents one or more network interface cards ("NICs"). Network interface 210 may facilitate communication over circuit-switched subnetworks, packet-switched subnetworks, or both types of subnetworks. In certain embodiments, network interface may facilitate communication between circuit-switched and packet-switched networks.

Processor 220 may represent or include any form of processing components, including dedicated microprocessors, general-purpose computers, or other devices capable of processing electronic information. Examples of processor 220 include field-programmable gate arrays ("FPGAs"), programmable microprocessors, digital signal processors ("DSPs"), application-specific integrated circuits ("ASICs"), and any other suitable specific- or general-purpose processors. Although FIG. 2 illustrates, for the sake of simplicity, an embodiment of initial detection point 50 that includes a single processor 220, initial detection point 50 may include any number of processors 220 configured to interoperate in any appropriate manner. For example, in particular embodiments, initial detection point 50 may include three field programmable gate arrays configured to: (1) applying one or more policy rules to one or more characteristics associated with a communication request; (2) when receiving a communication request, communicating an additional message (e.g., an initial address message) to the network device 20 associated with the caller information received with the communication request; and/or (3) determining that the network device associated with the caller information is in use at the time the communication request was received.

Memory 230 stores processor instructions, filter parameters, routing information, and/or any other data utilized by initial detection point 50 during operation. Memory 230 may comprise any collection and arrangement of volatile or non-volatile, local or remote devices suitable for storing data, such as random access memory ("RAM"), read only memory ("ROM"), magnetic storage, optical storage, or any other suitable type of data storage components. Although shown as a single element in FIG. 2, memory 230 may include one or more physical components local to or remote from initial detection point 50. Memory 230 may include rules 235.

Rules 235 may include logic, rules, algorithms, code, tables, and/or other suitable instructions embodied in a computer-readable storage medium. Rules 235 may comprise a set of policy rules. Processor 220 may access rules 235 in applying policy rules to determine the action to apply to a communication request as described with respect to FIG. 1. For example, rules 235 may contain a policy rule such that a communication request associated with a subscriber identifier that previously communicated ten consecutive short duration calls should be terminated. As another example, rules 235 may contain a policy rule that a communication request should be terminated if certificate validation is unsuccessful. Rules 235 may apply across some, all, or none of the initial detection point 50.

Database 240 represents a database that stores, either permanently or temporarily, associated characteristics with a communication request from network device 20. Database 240 includes any one or a combination of volatile or non-volatile local or remote devices suitable for storing information. For example, database 240 may include random access memory ("RAM"), read only memory ("ROM"), magnetic storage devices, optical storage devices, or any other suitable information storage device or a combination of these devices. Database 240 may include any suitable information for use in the operation of initial detection point 50. Additionally, database 240 may be included within initial detection point 50, rather than being a component external to initial detection point 50. Database 240 may be located in initial detection point 50, core network 40, access network 30, mobile communication system 10, or any other location suitable for database 240 to communicate with initial detection point 50. In certain embodiments, database 240 can be located in memory 230.

In particular embodiments, the structural components of initial detection point 50 may be attached to one or more chassis for mounting in a standard nineteen-inch ("19") or twenty-three-inch ("23") electronic rack. As a result, initial detection point 50 may represent a rack-mountable component that may be inserted into standard equipment racks commonly used to house telecommunications equipment in modern mobile communication systems, such as racks complying with EIA-310-D and/or EN 300 119. Thus, particular embodiments of initial detection point 50 may be easily integrated with existing equipment in many types of mobile communication systems. Furthermore, in particular embodiments, the components used to provide the functionality described for initial detection point 50 may be fit on a single chassis or a collection of chasses.

A component of initial detection point 50 may include an interface, logic, memory, and other suitable elements. An interface receives input, sends output processes the input and/or output, and performs other suitable operations. For example, the interface may communicate an IAM to the network device 20 associated with the caller information included in the communication request characteristics. An interface may comprise hardware and software. Logic performs the operation of the component. For example, logic executes instructions to generate output from input. Logic may include hardware, software and other logic. Logic may be encoded in one or more non-transitory, tangible media, such as a computer readable medium or any other suitable tangible medium, and may perform operations when executed by a computer. Certain logic, such as a processor, may manage the operation of a component. Examples of a processor include one or more computers, one or more microprocessors, one or more applications, and other logic.

Modifications, additions, or omissions may be made to initial detection point 50 without departing from the scope of the disclosure. For example, initial detection point 50 may include any number of network interfaces 210, processors 220, memory 230, or databases 240. Furthermore, the components of initial detection point 50 may be integrated or separated. For example, network interface 210, processor 220, memory 230, and database 240 may be incorporated into a single component.

Figure 3:
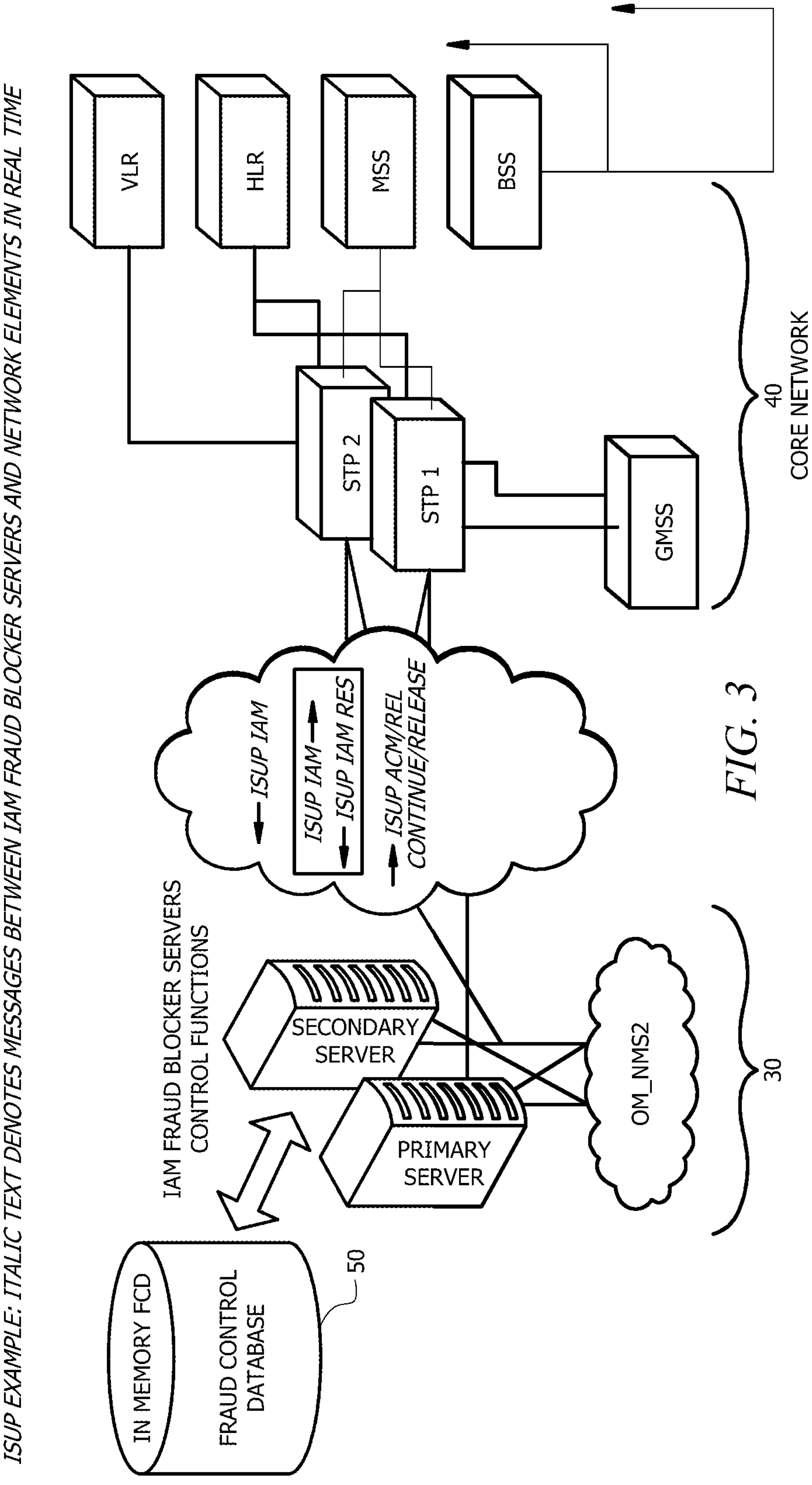
FIG. 3 illustrates a mobile communication system in which an initial detection point has been installed.

FIG. 3 illustrates the integration of initial detection point 50 and the network elements of a PSTN such as access network 30, and core network 40. In certain embodiments, initial detection point 50 may obtain by request, the identification of the calling party. The identification request invokes registration of one or more characteristics associated with the calling party. For example, characteristics of the calling party may include the called party number, the calling party number, forwarding information, the time and date of the call, the calling party sub-address, and certificate management or validation information (e.g., a signature use for validating identity, a reference to the certificate of the calling party) associated with the calling party. Initial detection point 50 may store characteristics of the calling party to identify, route, and authenticate additional communications from the calling party as well as provide the characteristics to other networks or network elements.

In certain embodiments, initial detection point 50 may act as a service switching function ("SSF") or service control function ("SCF") to continue or release communication requests based on the received characteristics associated with the communication in the identification request ("IDR"), identification response ("IRS"), secondary initial address message ("IAM"), and/or IAM response message. In certain embodiments, initial detection point 50 may interface between circuit-switched and packet-switched networks. For example, initial detection point 50 may receive a communication or communication request including a calling party identity via a circuit-switched network and route the communication or communication request via SIP protocol over a packet-switched network after verification of the calling party identity.

As illustrated in FIG. 3, only the secondary IAM is depicted as being sent out to the communications network to obtain the state of the received calling party number.

Figure 4:
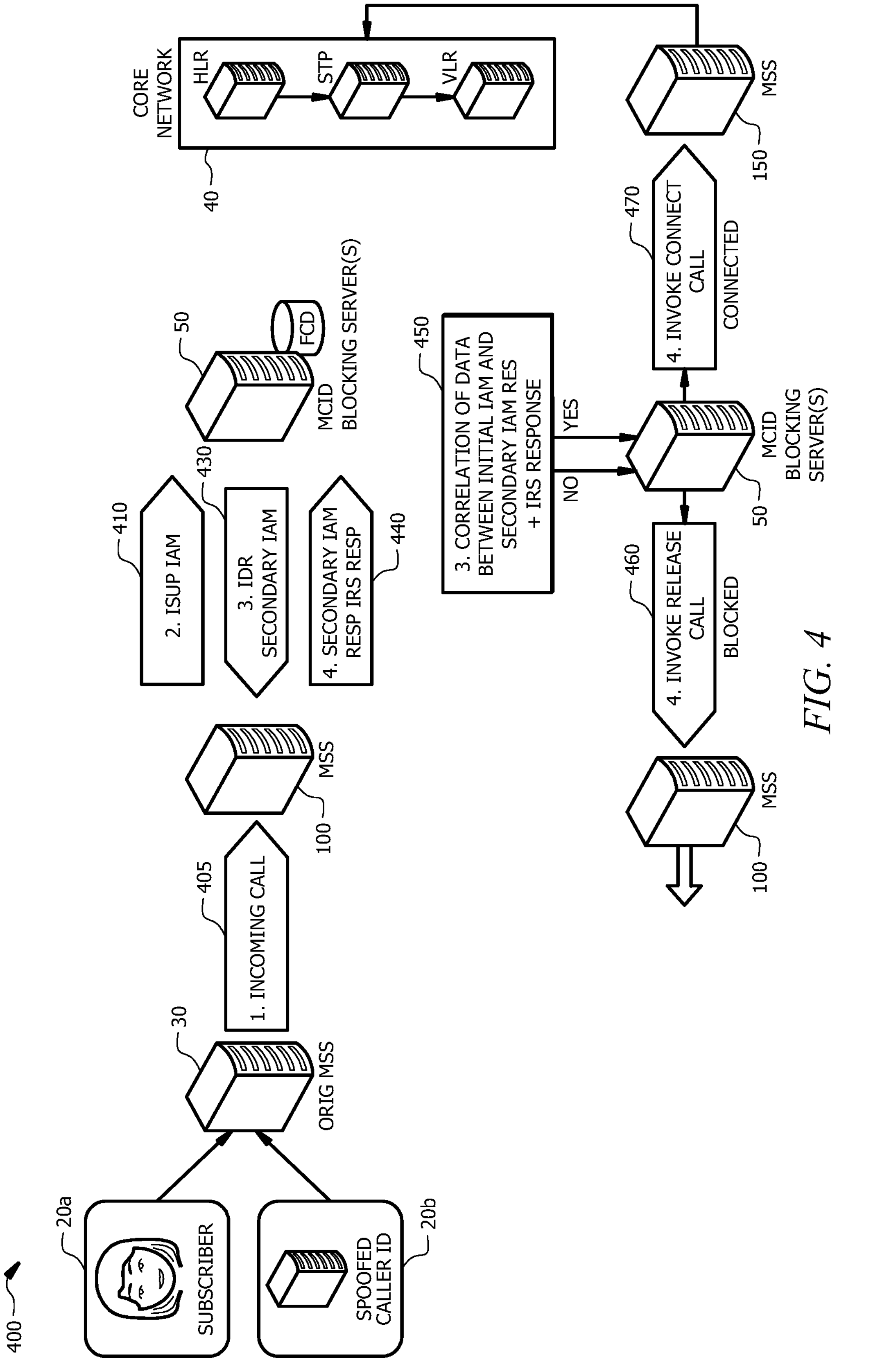
FIG. 4 is a block diagram showing a process flow of an initial detection point with a mobile communication system according to particular embodiments.

FIG. 4 illustrates an example block diagram showing the interaction of initial detection point 50 and a communication network receiving a communication request from an origin mobile switching station ("MSS") 30 from a spoofed caller 20*b* with fraudulent caller information. In certain embodiments, the various MSSes 30, 100, 150 depicted in FIG. 4 may be the same MSS. In an embodiment, a subscriber 20*a*, malicious fraudster 20*b*, or a MSS 30 places a call request with the communications network at block 405. The carrier MSS 100 receives the call setup 405 and holds the call before terminating and placing the call. The MSS 100 sends a first ISUP IAM at block 410 to the IAM initial detection point 50. At block 430, initial detection point 50 parses the first IAM and uses the calling party information MSISDN to create a second IAM back to the MSS. The second IAM is used to create a new call setup message back to the calling party information received in the first IAM. Initial detection point 50 may create an IDP message back to the communications network to check for malicious caller identification. The network 100 sends back the second IAM response to the second IAM call setup message at block 440.

In certain embodiments, the return message in block 440 from the network 100 will send the respective responses back to the blocking server or initial detection point 50 that is holding the call for the data checks before putting it through or blocking it. The second IAM response in 440 may contain the caller information 20 comprising whether the caller is "busy" or "free." In block 450, initial detection point 50 may correlate the data between the IAM received in 410 and the information obtained in block 440 to validate that the call is not malicious. If the status of the subscriber identified in the caller information is "free" as indicated in the response to the second IAM, it may be presumed that subscriber 20*a* associated with the caller information is not the true identity of caller 20*b* and the call may be determined to have been spoofed. Thus, in block 460, if the caller status is "free," an ISUP release message is returned for the first IAM and the call is released since the actual subscriber number is not currently in a call. However, in block 470, if the caller is "busy," identifying information is used to verify with whom the original calling party number is currently connected and an ISUP address complete message ("ACM") is sent with the current transaction ID/circuit identity code ("CIC") and the call setup for the original call may proceed. Initial detection point 50 may also receive the IRS response to the IDR message and may parse the IRS to determine if the caller ID is a malicious caller 20*b* and determine the other call identifying information associated with the original calling party. Based on the comparisons of the data from the first received IAM and the second IAM response along with data received from the IRS message, initial detection point 50 may either instruct the MSS to continue the call by sending an ACM message or instruct the MSS to release the call by sending a release message. In certain embodiments, the policy rules implemented by initial detection point 50 may comprise the interactions depicted in FIG. 4.

In certain embodiments, upon receiving a response to the IAM with the status of a networked device of "busy" or "free," initial detection point 50 may still allow fraudulent calls to be placed in certain circumstances. For example, if a malicious caller used a spoofed number associated with another networked device 20 that happened to be on an active call, and hence "busy," at the time the malicious caller attempted to place the spoofed call, initial detection point 50 may determine that the spoofed call originated from the "busy" networked device 20. Despite this, the vast majority of fraudulent calls will be prevented and this type of fraud may be effectively neutralized. In certain embodiments, the response to the secondary IAM includes the status of "busy" and also includes identification information of the currently connected number of the calling party. For a legitimate call, this is the phone number of the destination the subscriber 20*a* wishes to connect with when placing the original call (i.e., sending the first IAM) If the identifying information of the number the calling party is currently connected with from the response to the second IAM corresponds to the called number information included in the first IAM, initial detection point 50 may verify that the first IAM is a bona fide call and not a malicious or spoofed call. For example, in the case of a call with a spoofed caller ID, when initial detection point 50 sends the second IAM it would be directed to the networked device with the spoofed number and even if that networked device corresponding to the spoofed number happened to be on a call at the time the second IAM was sent when it responds to the second IAM indicating that it is busy the identification information of the currently connected party would presumably be another phone number other than the one the spoofed call is attempting to connect to. This would enable initial detection point 50 to detect false negative or otherwise to verify that the call is genuine. After verification, initial detection point 50 may complete the call setup request and the original call from 405 continues to the destination local exchange 150.

In certain other embodiments, the technique for the prevention of malicious calls may be carried out on other communication architectures including Diameter protocol. According to such an embodiment, initial detection point 50 may act as a Call Session Control Function ("CSCF") to receive a SIP and/or Invite message from the originating MSS 100 in block 410. Like the ISUP IAM, the request to make a call in block 410 under Diameter protocol will contain characteristic on the called party and the calling party. Such characteristics may include the IP, Port, and/or Username ("URI") information of the purported calling party. At block 430, initial detection point 50 may similarly seek—by a lookup method, a reverse call, and/or by invoking other SS7, ISUP, or Diameter messages—the status information of the networked device 20 according to the provided calling party identification from the Invite message in block 410. When the response to the message in block 430 is received by initial detection point 50 in block 440, the initial detection point 50 may then correlate the status information, including the currently connected party of a "busy" networked device 20, to ascertain if the calling party provided in the Invite message of block 410 is legitimate. It may also be appreciated that in performing the malicious call prevention functions, initial detection point 50 may employ signaling commands under multiple different protocols. For example, initial detection point 50 may receive communications under the CAMEL or ISUP protocol, determine the appropriate action to take on the communication (e.g., by determining characteristics and applying policy rules), convert or modify the communication to the SIP protocol, append a certificate, signature, and/or other authenticator to the communication, and route the communication to another routing point. Initial detection point 50 may take these actions in any appropriate order.

In certain embodiments, the interactions of initial detection point 50, originating MSS 100, and destination local exchange 150 may implement certificate management and validation procedures for cryptographic authentication (e.g., Signature-based Handling of Asserted information using toKENS ("SHAKEN") such as those based on X.509 certificate management standards and incorporated into the SHAKEN standards for telecommunications). Further detail on the SHAKEN standards is available from the governing bodies, including the Alliance for Telecommunications Industry Solutions and the SIP Forum and also from joint standards documents (ATIS-1000074, Signature-based Handling of Asserted Information using Tokens (SHAKEN); ATIS-1000080, Signature-based Handling of Asserted Information using Tokens (SHAKEN): Governance Model and Certificate Management).

Certificate management and validation procedures may be implemented prior to or as part of policy rules that determine a variety of actions (e.g., terminate, connect, hold) to apply to a communication request. For example, initial detection point 50 may permit a communication to proceed with an appropriate authenticator based on the results of certificate validation. In certain embodiments, initial detection point 50 may determine an appropriate authenticator based on the success or failure of certificate validation or based on an error in certificate management or validation procedures. For example, initial detection point 50 may permit a communication to proceed without any authenticator based on a successful certificate validation, or it may append a certificate, signature, or other authenticator to the communication based to indicate a successful certificate validation to communication's next routing point.

In certain embodiments, certificate management and validation procedures may be implemented across signaling or communications protocols. In certain embodiments, a communication may originate in a network that implements one signaling or communication protocol (e.g., CAMEL) and be routed to a network that implements another signaling or communication protocol (e.g., SIP). In certain embodiments, certificate management and validation procedures may be implemented across network types. Certificate management and validation procedures for cryptographic authentication (e.g., SHAKEN) may be implemented for communications or communication requests originating in and routing to circuit-switched or packet-switched networks using any appropriate signaling or communication protocol or combination of signaling or communication protocols. For example, a certificate may be generated for a communication or communication request originating in a circuit-switched network using the CAMEL protocol and routed in a packet-switched network using the SIP protocol. An originating service provider may provide and authenticate caller information as well as provide for the verification of this caller information by a terminating service provider, even if the service providers use different network types or communication protocols. This permits, for example, validation of communications between legacy networks and IP networks for VOIP and voice-over-LTE (VOLTE).

Certificate management and validation procedures may include appending a certificate, signature, or other authenticator to a communication or communication request. For example, initial detection point 50 may receive a communication request or communication, validate a certificate based on information in the communication request or communication, append a certificate or signature to an outgoing packet, based on the received information and validation results, and route the outgoing packet to its next routing point. Appending the certificate, signature, or authenticator may facilitate other routing points to take an appropriate action on the communication request or communication. For example, a routing point may authenticate, trust, terminate, or route a communication request or communication based on appended information.

Figure 5:
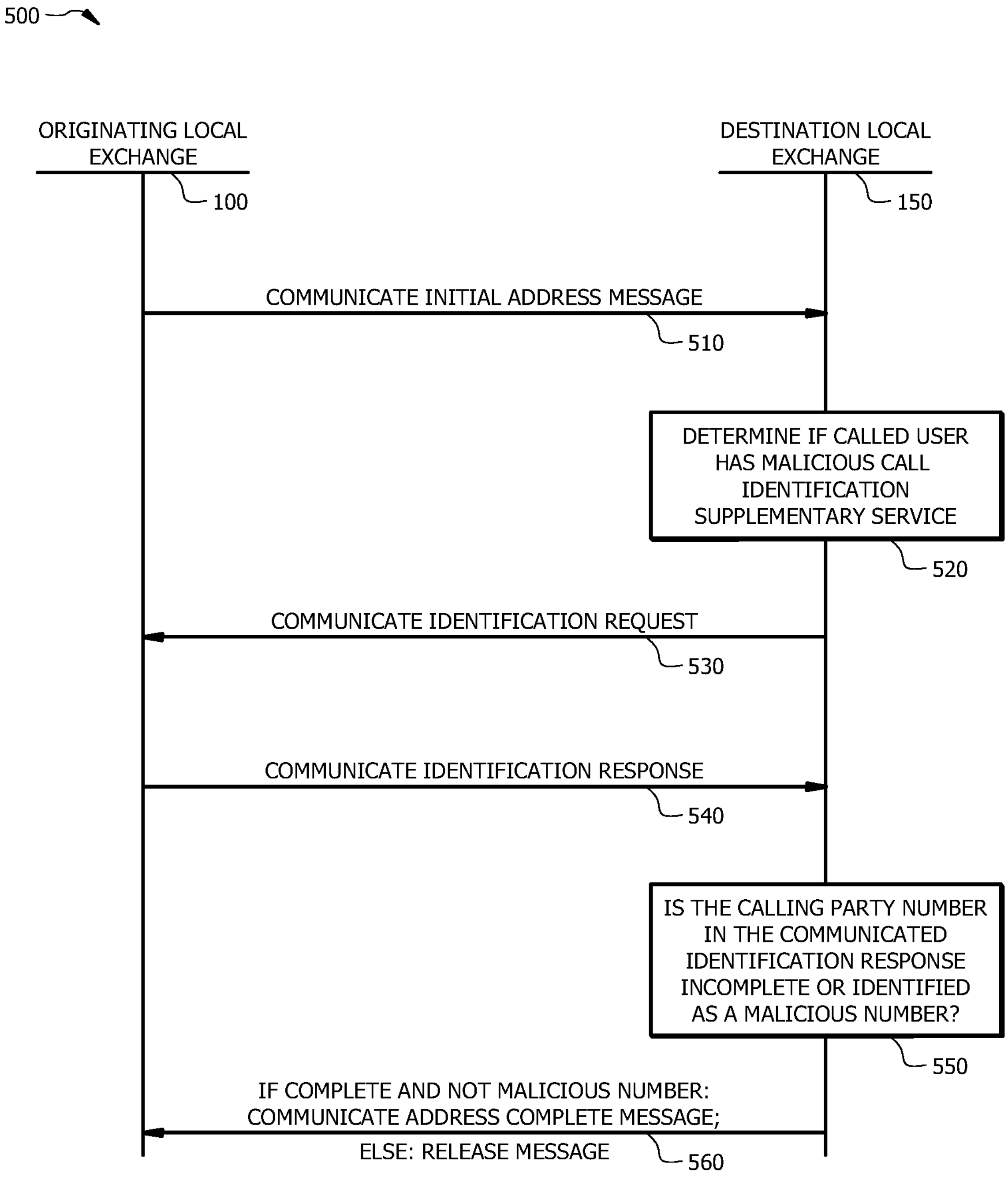
FIG. 5 illustrates an exemplary interaction diagram depicting the interaction that may occur between a calling user and a mobile communication system.

FIG. 5 illustrates an exemplary signaling diagram 500 that depicts the interaction between an originating local exchange 100 and a destination local exchange 150. In certain embodiments, the internal signaling flow interaction will follow the recommendation Q.731.7 as established by the international telecommunication union for number identification supplementary services using a signaling system for malicious call identification ("MCID"). In certain embodiments, initial detection point 50 may perform MCID operations. In certain embodiments, the originating local exchange 100 will communicate an IAM in step 510. Next, the destination local exchange 150 will determine if the called user has MCID supplementary service in step 520. In step 530, destination local exchange 150 will send an IDR. The originating local exchange 100 then may reply with an IRS in step 540. In step 550, destination local exchange 150 will determine if the calling party number in the communicated IDS response was either incomplete or was identified as a malicious number. In step 560, if either the calling party number in the IDR is incomplete or the calling party number was identified as a malicious number then the destination local exchange 150 sends a release ("REL") message, otherwise the destination local exchange 150 sends an ACM and the requested call proceeds. In certain embodiments, the policy rules implemented by initial detection point 50 may comprise the interactions depicted in FIG. 5.

Particular embodiments may repeat one or more steps in the interactions in FIG. 5, where appropriate. Although this disclosure describes and illustrates particular steps of the interactions of FIG. 5 as occurring in a particular order, this disclosure contemplates any suitable steps of the method of FIG. 5 occurring in any suitable order. For example, one or more steps may be performed in parallel. Moreover, the steps may include more, fewer, or other steps. Furthermore, although this disclosure describes and illustrates particular components, devices, or systems carrying out particular steps of the interactions of FIG. 5, this disclosure contemplates any suitable combination of any suitable components, devices, or systems carrying out any suitable steps of the method of FIG. 5.

Figure 6:
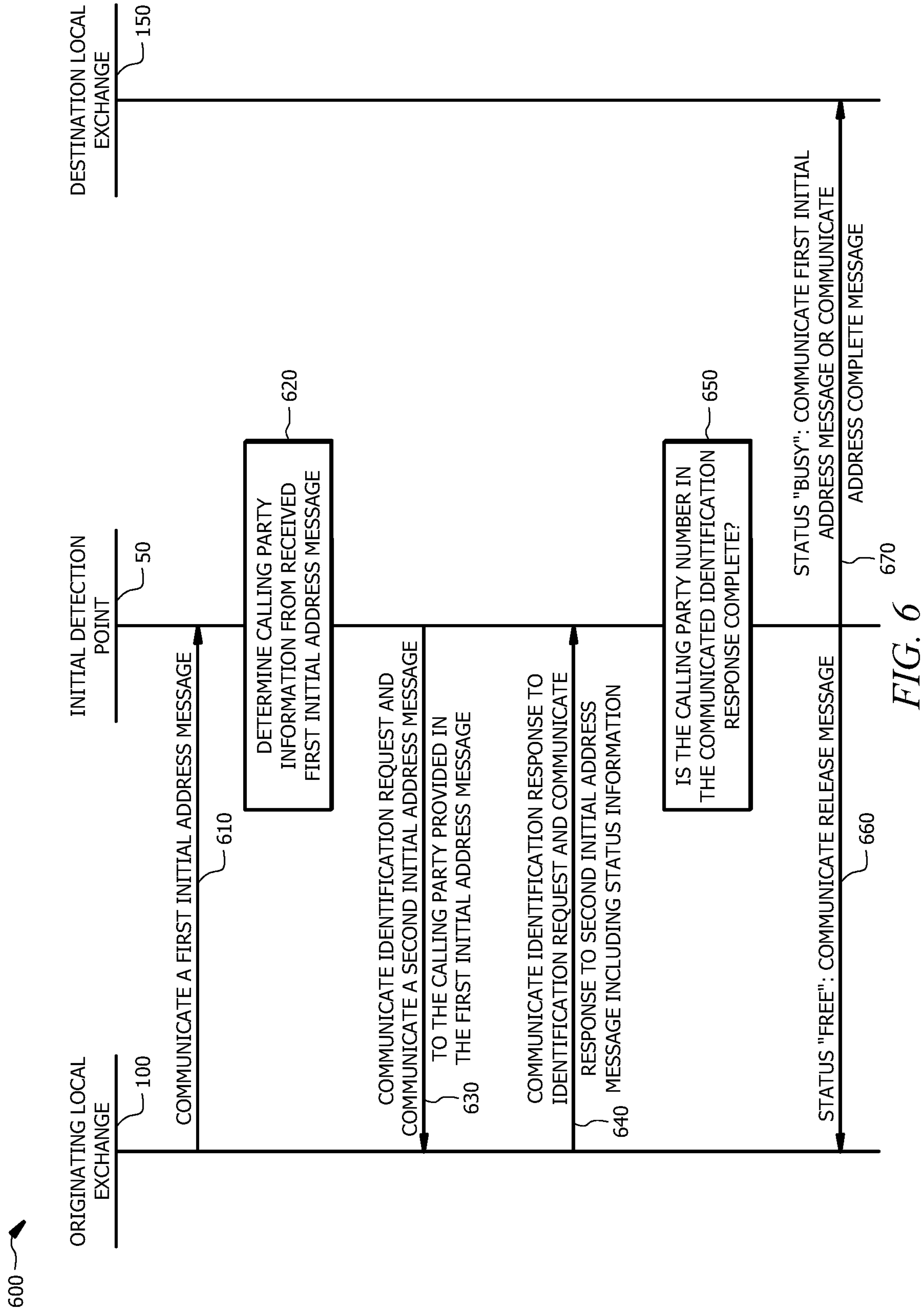
FIG. 6 illustrates an exemplary interaction diagram depicting the interaction that may occur between a calling user and a mobile communication system in which an initial detection point has been installed.

FIG. 6 illustrates an exemplary signaling diagram 600 that depicts the interactions between an originating local exchange 100, an initial detection point 50, and a destination local exchange 150. As illustrated in FIG. 6. the prevention of malicious calls may be implemented on CAMEL and ISUP signaling systems. It should be understood by one of skill in the art that these techniques may also be implemented and carried out under other communication protocols such as Diameter. Initial detection point 50 may also be an MSS or an MCID blocking server. In certain embodiments, the internal signaling flow interaction will comply with recommendation Q.731.7 as established by the international telecommunication union for number identification supplementary services using a signaling system MCID and implement additional signaling flow interactions. In certain embodiments, initial detection point 50 may perform MCID operations. In certain embodiments, the originating local exchange 100 will send a first IAM to initial detection point 50 in step 610. In step 620, initial detection point 50 may determine the calling party information from the IAM received from originating local exchange 100. Initial detection point 50 may then send an IDR and a second IAM in step 630. In certain embodiments, the IDR and the second IAM may be sent as a single message, sent in separate messages, or may be sent in a plurality of partial messages. The originating local exchange 100 may reply in step 640 to initial detection point 50 with an IRS and a second IAM. In certain embodiments, the IRS and the second IAM may be sent as a single message, sent in separate messages, or may be sent in a plurality of partial messages. Next, the initial detection point 50 in step 650 may determine the status of the purported networked device from the second IAM. In certain other embodiments, in step 650, the initial detection point 50 may also determine identification information such as a phone number for the currently connected device with whom the networked device is on a call. If the number that the networked device is on a call with matches the number from the IAM in step 610, the call will be verified. The initial detection point 50 will then either send an IAM or ACM to the destination local exchange in step 670 if the networked device status is "busy," otherwise, in step 660 if the networked device status is "free" the initial detection point will transmit a REL message to the originating local exchange. In certain embodiments, the IAM or ACM may be sent as a single message, sent in separate messages, may be sent in a plurality of partial messages, or only one or the other may be sent. In certain embodiments, the policy rules implemented by initial detection point 50 may comprise the interactions depicted in FIG. 6.

Particular embodiments may repeat one or more steps in the interactions in FIG. 6, where appropriate. Although this disclosure describes and illustrates particular steps of the interactions of FIG. 6 as occurring in a particular order, this disclosure contemplates any suitable steps of the method of FIG. 6 occurring in any suitable order. For example, one or more steps may be performed in parallel. Moreover, the steps may include more, fewer, or other steps. Furthermore, although this disclosure describes and illustrates particular components, devices, or systems carrying out particular steps of the interactions of FIG. 6, this disclosure contemplates any suitable combination of any suitable components, devices, or systems carrying out any suitable steps of the method of FIG. 6.

The prior embodiments and examples make various reference to cellular calling systems, but it should be understood by one of ordinary skill in the art that the embodiments listed are not limited to cellular calls but also encompass VOIP calls, Wi-Fi calls, internet video calls, and other IP-based calling systems. The functionality of the present disclosure will be similar on any communications system that provides caller information in a communications request for networked device 20. For example, embodiments of the present disclosure may operate on VOIP based calls by using SIP identifiers of a communications request to perform MCID services.

Certain embodiments may employ features of the relevant protocols (e.g., CAMEL, ISUP, DIAMETER) across both circuit-switched networks and packet-switched networks. For example, a communication originating under CAMEL protocol may be routed via a circuit-switched network to initial detection point 50, which performs certificate validation and routes the communication via SIP to its destination in a packet-switched network.

Herein, the terms "free" and/or "busy" are used to denote certain statuses of networked device 20 or other components of system 10. It should be understood by one of ordinary skill in the art that these are not the exclusive statuses and that other statuses are contemplated and may be encompassed by the terms "free" and/or "busy." For example, "busy" may also include nonexclusive concepts such as active, unavailable, occupied, engaged, or in use. Likewise, "free" may also include nonexclusive concepts such as idle, inactive, unengaged, accessible, or unoccupied.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. An apparatus, comprising:

a network interface operable to receive a communication request over a communication link of a radio access network via a first communication protocol, wherein the first communication protocol is one of a legacy signaling protocol, an SIP protocol, or a VOIP protocol; and a processor communicatively coupled to the network interface and operable to:

authenticate caller information associated with the communication request by performing a validation procedure implementing signature-based handling of the caller information using tokens;

obtain an authenticator after authenticating the caller information;

store the authenticator;

receive a verification request from a destination network; and transmit the authenticator to the destination network in response to the verification request.

2. The apparatus of claim 1, wherein obtaining an authenticator comprises generating the authenticator.

3. The apparatus of claim 1, wherein obtaining an authenticator comprises receiving the authenticator as part of a certificate management and validation procedure for cryptographic authentication.

4. The apparatus of claim 1, wherein the processor is further operable to:

transmit the communication request in response to the authenticator indicating that the communication request is authorized to be routed to a second networked device.

5. The apparatus of claim 1, wherein the verification request is received via a second communication protocol.

6. The apparatus of claim 5, wherein the processor is further operable to:

convert the communication request for transmission via the second communication protocol; and transmit the communication request.

7. Non-transitory computer readable medium comprising logic, the logic, when executed by a processor, operable to:

authenticate caller information associated with the communication request by performing a validation procedure implementing signature-based handling of the caller information using tokens;

obtain an authenticator after authenticating the caller information;

store the authenticator;

receive a verification request from a destination network via a first communication protocol, wherein the first communication protocol is one of a legacy signaling protocol, an SIP protocol, or a VOIP protocol; and transmit the authenticator to the destination network in response to the verification request.

8. The non-transitory computer readable medium of claim 7, wherein obtaining an authenticator comprises generating the authenticator.

9. The non-transitory computer readable medium of claim 7, wherein obtaining an authenticator comprises receiving the authenticator as part of a certificate management and validation procedure for cryptographic authentication.

10. The non-transitory computer readable medium of claim 7, wherein the logic is further operable to:

transmit the communication request in response to the authenticator indicating that the communication request is authorized to be routed to a second networked device.

11. The non-transitory computer readable medium of claim 7, wherein the verification request is received via a second communication protocol.

12. The non-transitory computer readable medium of claim 11, wherein the logic is further operable to:

convert the communication request for transmission via the second communication protocol; and transmit the communication request.

13. A method, comprising:

authenticating caller information associated with the communication request by performing a validation procedure implementing signature-based handling of the caller information using tokens;

obtaining an authenticator after authenticating the caller information;

storing the authenticator;

receiving a verification request from a destination network via a first communication protocol, wherein the first communication protocol is one of a legacy signaling protocol, an SIP protocol, or a VOIP protocol; and transmitting the authenticator to the destination network in response to the verification request.

14. The method of claim 13, wherein obtaining an authenticator comprises generating the authenticator.

15. The method of claim 13, further comprising:

transmitting the communication request in response to the authenticator indicating that the communication request is authorized to be routed to a second networked device.

16. The method of claim 13, wherein the verification request is received via a second communication protocol.

17. The method of claim 16, wherein the logic is further operable to:

convert the communication request for transmission via the second communication protocol; and transmit the communication request.

* * * * *